United States Patent
Kim

(10) Patent No.: US 7,538,842 B2
(45) Date of Patent: May 26, 2009

(54) LIQUID CRYSTAL DISPLAY PANEL WITH ALIGNING MEMBERS PARALLEL TO DATA LINES THAT ARE EITHER ELECTRICALLY FLOATING OR AT SUBSTANTIALLY THE SAME VOLTAGE AS THE DATA LINES

(75) Inventor: Dong-Gyu Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 629 days.

(21) Appl. No.: 11/016,475

(22) Filed: Dec. 16, 2004

(65) Prior Publication Data
US 2005/0134540 A1    Jun. 23, 2005

(30) Foreign Application Priority Data
Dec. 19, 2003    (KR) .................. 10-2003-0094066

(51) Int. Cl.
*G02F 1/1337* (2006.01)
(52) U.S. Cl. ...................... 349/129; 349/130
(58) Field of Classification Search .......... 349/129–132
See application file for complete search history.

(56) References Cited

U.S. PATENT DOCUMENTS

| | | | |
|---|---|---|---|
| 5,309,264 A * | 5/1994 | Lien et al. ................. 349/143 |
| 6,307,216 B1 | 10/2001 | Huh et al. |
| 6,573,532 B2 | 6/2003 | Park |
| 7,167,225 B2 * | 1/2007 | Kim .......................... 349/139 |
| 2002/0054248 A1 | 5/2002 | Cheng et al. |
| 2002/0171782 A1 | 11/2002 | Yee et al. |
| 2003/0146435 A1 | 8/2003 | Lai |

FOREIGN PATENT DOCUMENTS

CN    1290920 A    4/2001

OTHER PUBLICATIONS

English Language Abstract, CN1290920, Apr. 11, 2001, 1 p.

* cited by examiner

*Primary Examiner*—David Nelms
*Assistant Examiner*—John Heyman
(74) *Attorney, Agent, or Firm*—Haynes and Boone LLP

(57) ABSTRACT

A liquid crystal display is provided, which includes: a substrate; a field-generating electrode formed on the substrate; and a slope member formed on the substrate and having an inclination angle smaller than about 45 degrees.

10 Claims, 14 Drawing Sheets

LIQUID CRYSTAL DISPLAY PANEL WITH ALIGNING MEMBERS PARALLEL TO DATA LINES THAT ARE EITHER ELECTRICALLY FLOATING OR AT SUBSTANTIALLY THE SAME VOLTAGE AS THE DATA LINES

BACKGROUND OF THE INVENTION (a) Field of the Invention

The present invention relates to a liquid crystal display and a panel therefor.

(b) Description of the Related Art

A liquid crystal display (LCD) is one of the most widely used flat panel displays. An LCD includes two panels provided with field-generating electrodes such as pixel electrodes and a common electrode and a liquid crystal (LC) layer interposed therebetween. The LCD displays images by applying voltages to the field-generating electrodes to generate an electric field in the LC layer, which determines orientations of LC molecules in the LC layer to adjust polarization of incident light.

When an active area on a backplane for LCDs is too large to use an exposure mask, the entire exposure is accomplished by repeating a divisional exposure called step-and-repeat process. One divisional exposure unit or area is called a shot. Since transition, rotation, distortion, and etc. are generated during light exposure, the shots are not aligned accurately. Accordingly, parasitic capacitances generated between signal lines and pixel electrodes differ depending on the shots, and this causes the luminance difference between the shots, which is recognized at the pixels located at a boundary between the shots. Therefore, the stitch defect is generated on the screen of the LCD due to luminance discontinuity between the shots.

In the meantime, a vertical alignment (VA) mode LCD, which aligns LC molecules such that the long axes of the LC molecules are perpendicular to the panels in absence of electric field, is spotlighted because of its high contrast ratio and wide reference viewing angle that is defined as a viewing angle making the contrast ratio equal to 1:10 or as a limit angle for the inversion in luminance between the grays.

The wide viewing angle of the VA mode LCD can be realized by cutouts in the field-generating electrodes and protrusions on the field-generating electrodes. Since the cutouts and the protrusions can determine the tilt directions of the LC molecules, the tilt directions can be distributed into several directions by using the cutouts and the protrusions such that the reference viewing angle is widened.

The VA mode LCD usually employs a normally black mode for obtaining high contrast ratio. However, this may decrease the lateral visibility such that the displayed image looks brighter and whiter as it goes to the sides.

SUMMARY OF THE INVENTION

A motivation of the present invention is to solve the problems of the conventional art.

A thin film transistor array panel is provided, which includes: a first signal line; a second signal line intersecting the first signal line; a thin film transistor connected to the first signal line and the second signal line; a pixel electrode connected to the thin film transistor; and an aligning member extending substantially parallel to the second signal line, overlapping the second signal line, and having an edge closer to the pixel electrode than the second signal line.

The aligning member and the pixel electrode may be disposed on the same layer.

The alignment member may be connected to the second signal line.

A thin film transistor array panel is provided, which includes: a first signal line; a second signal line intersecting the first signal line; a thin film transistor connected to the first signal line and the second signal line; a pixel electrode connected to the thin film transistor; and an aligning member connected to the pixel electrode and having an edge closer to the pixel electrode than the second signal line.

The aligning member and the second signal line may be disposed on the same layer.

The thin film transistor may include a drain electrode connected to the pixel electrode and the aligning member.

A liquid crystal display is provided, which includes: a first panel including a first signal line, a second signal line intersecting the first signal line, a thin film transistor connected to the first signal line and the second signal line, a pixel electrode connected to the thin film transistor, and an aligning member extending substantially parallel to the second signal line and having an edge closer to the pixel electrode than the second signal line; a second panel facing the first panel and including a common electrode formed thereon; and a liquid crystal layer disposed between the first panel and the second panel.

A liquid crystal display is provided, which includes: a first panel including a first signal line, a second signal line intersecting the first signal line, a thin film transistor connected to the first signal line and the second signal line, a pixel electrode connected to the thin film transistor, and an aligning member connected to the pixel electrode and having an edge closer to the pixel electrode than the second signal line; a second panel facing the first panel and including a common electrode formed thereon; and a liquid crystal layer disposed between the first panel and the second panel.

The liquid crystal display may further include a tilt direction determining member disposed at least one of the first and the second panels and determining tilt directions of liquid crystal molecules of the liquid crystal layer.

The liquid crystal layer may have negative dielectric anisotropy and is subjected to vertical alignment.

The tilt direction determining member may include a cutout formed at the pixel electrode or the common electrode.

The tilt direction determining member may have a width ranging about 9-12 microns.

The tilt direction determining member may make an angle of about 45 degrees with the first signal line.

The tilt direction determining member may include a protrusion formed on the pixel electrode or the common electrode.

BRIEF DESCRIPTION OF THE DRAWINGS

The present invention will become more apparent by describing embodiments thereof in detail with reference to the accompanying drawings in which.

DETAILED DESCRIPTION OF EMBODIMENTS

Figure 1:
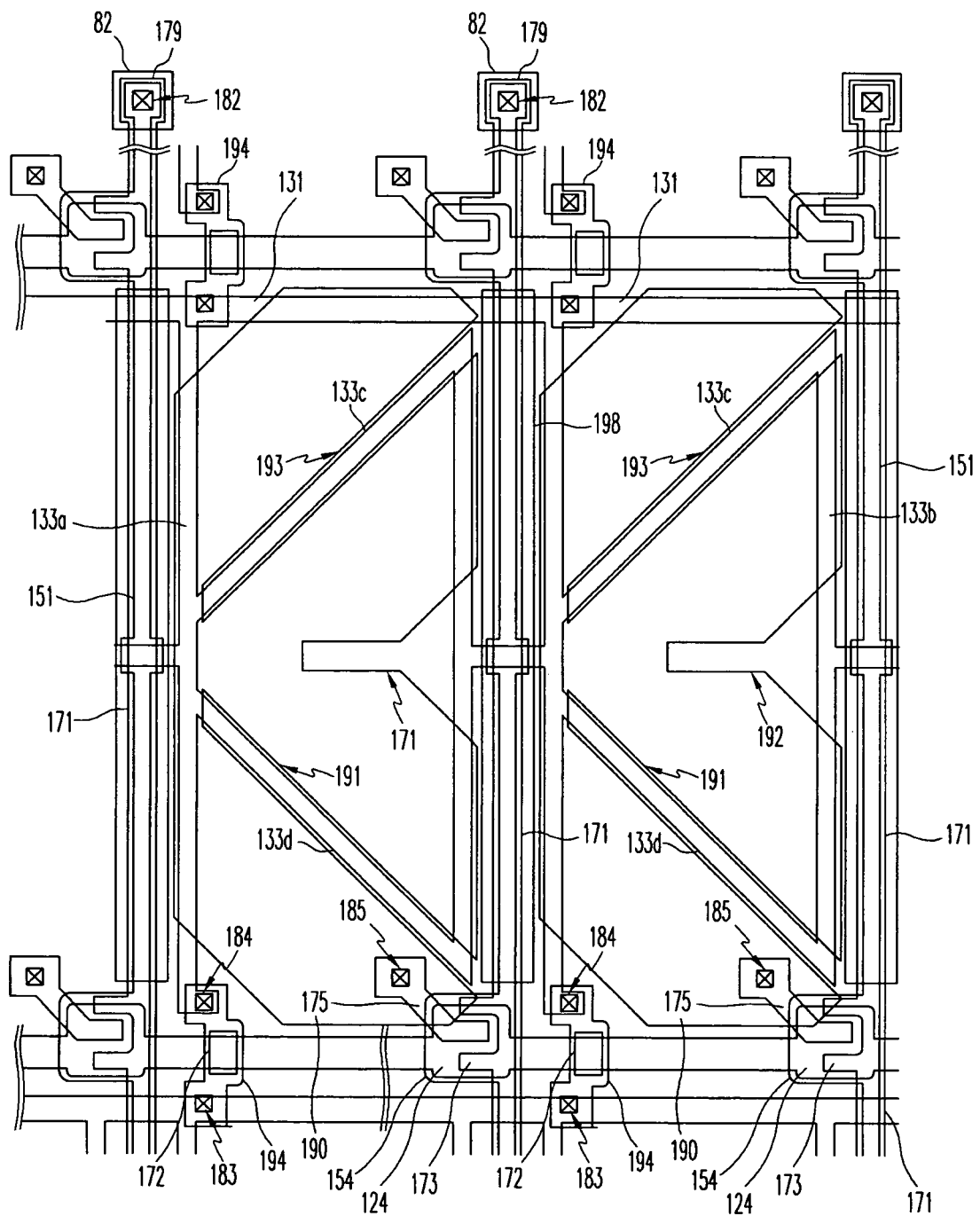
FIG. 1 is a layout view of a TFT array panel of an LCD according to an embodiment of the present invention.

The present invention now will be described more fully hereinafter with reference to the accompanying drawings, in which preferred embodiments of the invention are shown. The present invention may, however, be embodied in many different forms and should not be construed as limited to the embodiments set forth herein.

In the drawings, the thickness of layers, films and regions are exaggerated for clarity. Like numerals refer to like elements throughout. It will be understood that when an element such as a layer, film, region or substrate is referred to as being "on" another element, it can be directly on the other element or intervening elements may also be present. In contrast, when an element is referred to as being "directly on" another element, there are no intervening elements present.

Now, liquid crystal displays and thin film transistor (TFT) array panels for LCDs according to embodiments of the present invention will be described with reference to the accompanying drawings.

An LCD according to an embodiment of the present invention will be described in detail with reference to FIGS. 1-5.

Figure 2:
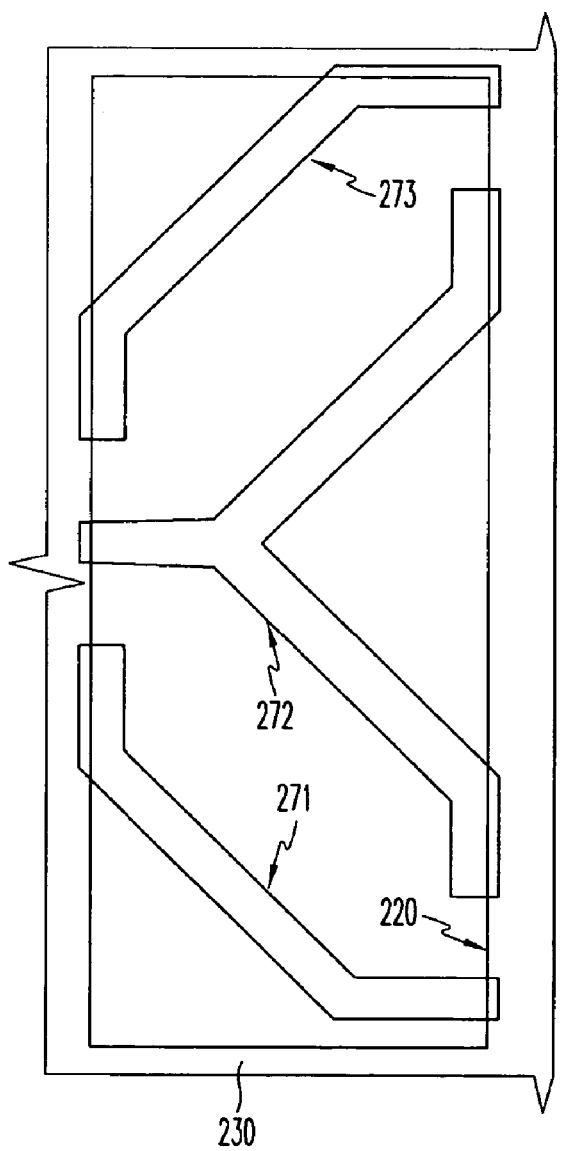
FIG. 2 is a layout view of a common electrode panel of an LCD according to an embodiment of the present invention.
Figure 3:
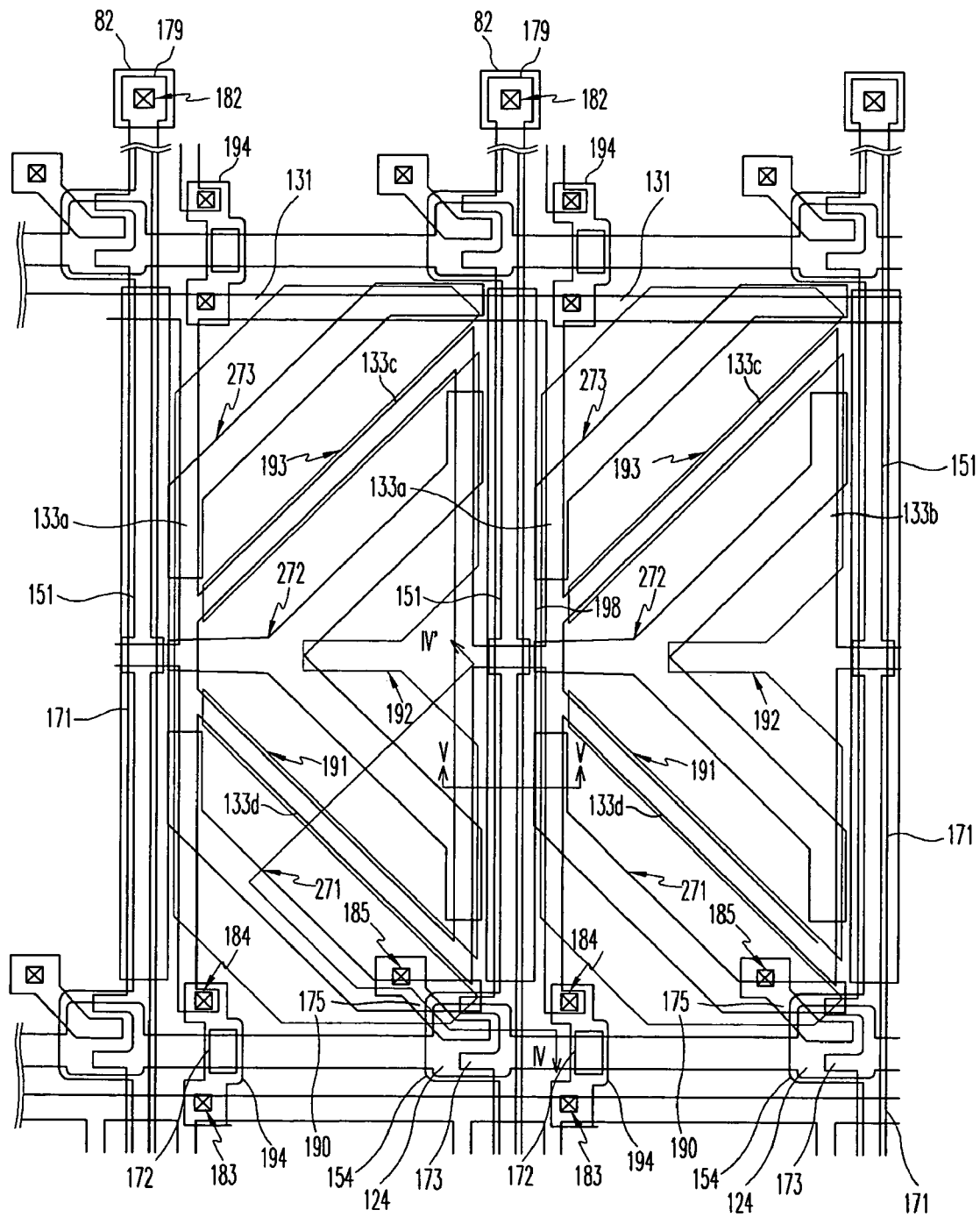
FIG. 3 is a layout view of an LCD including the TFT array panel shown in FIG. 1 and the common electrode panel shown in FIG. 2.
Figure 4:
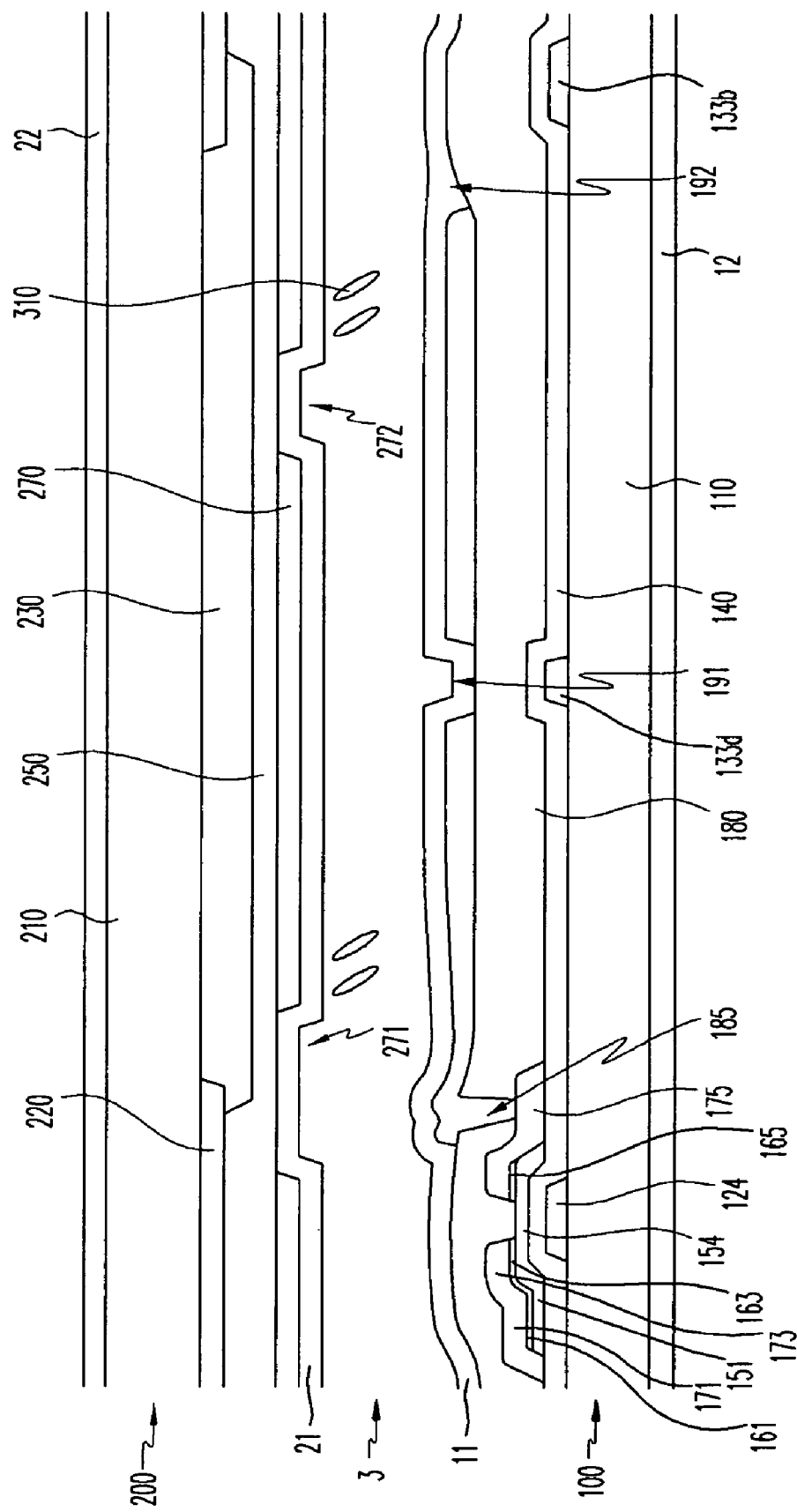
FIGS. 4 and 5 are sectional views of the LCD shown in FIG. 3 taken along the lines IV-IV' and V-V'.
Figure 5:
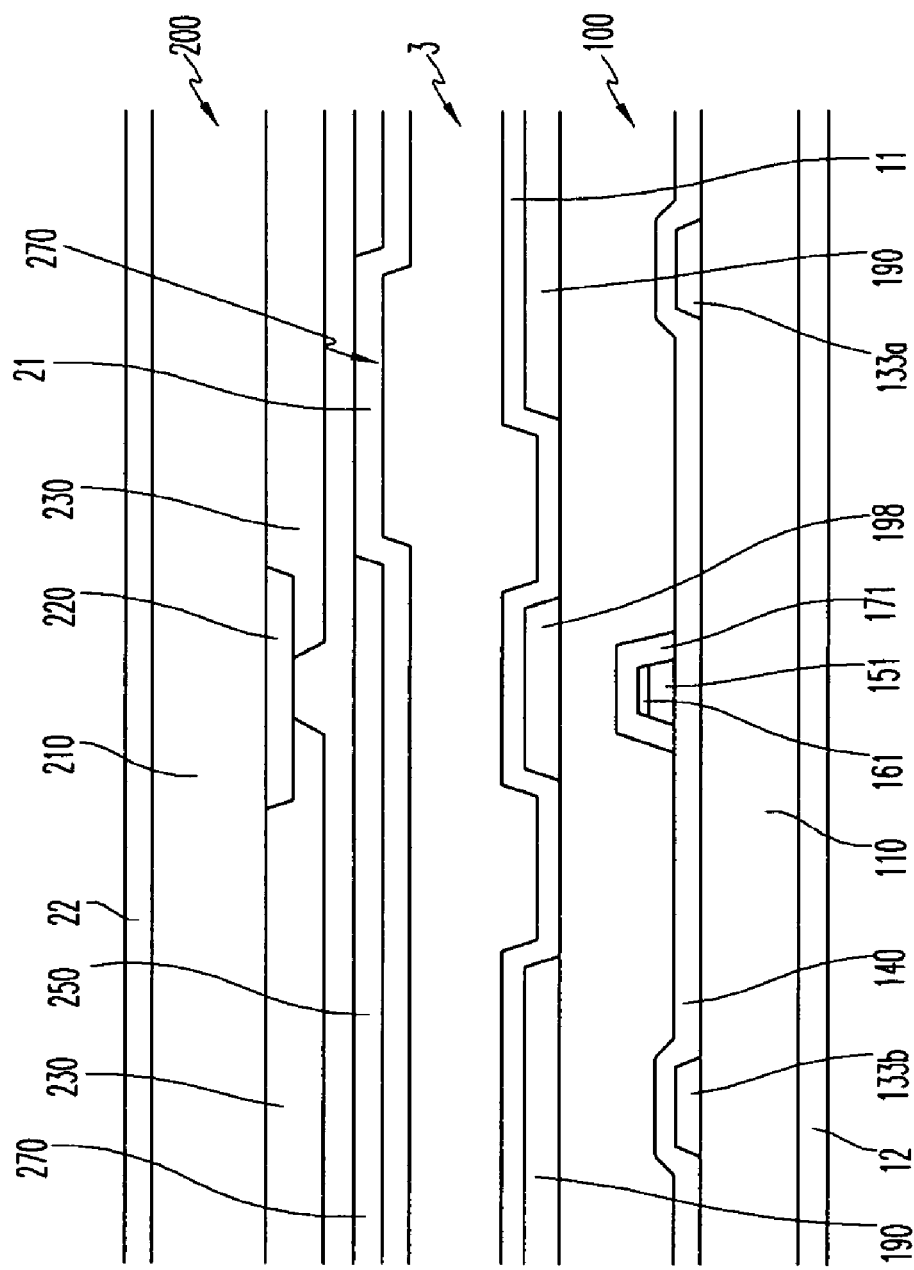

FIG. 1 is a layout view of a TFT array panel of an LCD according to an embodiment of the present invention, FIG. 2 is a layout view of a common electrode panel of an LCD according to an embodiment of the present invention, FIG. 3 is a layout view of an LCD including the TFT array panel shown in FIG. 1 and the common electrode panel shown in FIG. 2, and FIGS. 4 and 5 are sectional views of the LCD shown in FIG. 3 taken along the lines IV-IV' and V-V'.

An LCD according to an embodiment of the present invention includes a TFT array panel 100, a common electrode panel 200, and a LC layer 3 interposed between the panels 100 and 200.

The TFT array panel 100 is now described in detail with reference FIGS. 1 and 3-5.

A plurality of gate lines 121 and a plurality of storage electrode lines 131 are formed on an insulating substrate 110 such as transparent glass.

The gate lines 121 extend substantially in a transverse direction and are separated from each other and transmit gate signals. Each gate line 121 includes a plurality of projections forming a plurality of gate electrodes 124 and may extend to be connected a driving circuit that may be integrated on the TFT array panel 100. Each gate line 121 may include an end portion having a large area for contact with another layer or an external driving circuit.

Each storage electrode line 131 extends substantially in the transverse direction and is disposed between adjacent two of the gate lines 121 and close to upper one of the two gate lines 121. Each storage electrode line 131 includes a plurality of sets of branches 133a-133d and a plurality of connections 133e connecting the branches 133a-133d.

A set of branches 133a-133d includes two longitudinal branches forming first and second storage electrodes 133a and 133b and spaced apart from each other and two oblique branches forming third and fourth storage electrodes 133c and 133d and connected between the first and the second storage electrodes 133a and 133b. In detail, the first storage electrode 133a has a free end portion and a fixed end portion that is connected to the storage electrode line 131 and has a projection. The third and the fourth storage electrodes 133c and 133d extend approximately from a center of the first storage 133a and upper and lower ends of the second storage electrode 133b, respectively.

Each of the connections 133e is connected between a first storage electrode 133a of a set of storage electrodes 133a-133d and a second storage electrode 133b of another set of storage electrodes 133a-133d adjacent thereto.

The storage electrode lines 131 are supplied with a predetermined voltage such as a common voltage, which is applied to a common electrode 270 on the common electrode panel 200 of the LCD. Each storage electrode line 131 may include a pair of stems extending in the transverse direction.

The gate lines 121 and the storage electrode lines 131 are preferably made of Al containing metal such as Al and Al alloy, Ag containing metal such as Ag and Ag alloy, Cu containing metal such as Cu and Cu alloy, Mo containing metal such as Mo and Mo alloy, Cr, Ti or Ta. The gate lines 121 and the storage electrode lines 131 may have a multi-layered structure including two films having different physical characteristics. One of the two firms is preferably made of low resistivity metal including Al containing metal, Ag containing metal, and Cu containing metal for reducing signal delay or voltage drop in the gate lines 121 and the storage electrode lines 131. The other film is preferably made of material such as Mo containing metal, Cr, Ta or Ti, which has good physical, chemical, and electrical contact characteristics with other materials such as indium tin oxide (ITO) or indium zinc oxide (IZO). Good examples of the combination of the two films are a lower Cr film and an upper Al—Nd alloy film and a lower Al film and an upper Mo film.

In addition, the lateral sides of the gate lines 121 and the storage electrode lines 131 are inclined relative to a surface of the substrate, and the inclination angle thereof ranges about 20-80 degrees.

A gate insulating layer 140 preferably made of silicon nitride (SiNx) is formed on the gate lines 121 and the storage electrode lines 131.

A plurality of semiconductor stripes 151 preferably made of hydrogenated amorphous silicon (abbreviated to "a-Si") or polysilicon are formed on the gate insulating layer 140. Each semiconductor stripe 151 extends substantially in the longitudinal direction and has a plurality of projections 154 branched out toward the gate electrodes 124. The semiconductor stripes 151 become wide near the gate lines 121 and the storage electrode lines 131 such that the semiconductor stripes 151 cover large areas of the gate lines 121 and the storage electrode lines 131.

A plurality of ohmic contact stripes and islands 161 and 165 preferably made of silicide or n+hydrogenated a-Si heavily doped with n type impurity such as phosphorous are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are inclined relative to a surface of the substrate, and the inclination angles thereof are preferably in a range between about 30-80 degrees.

A plurality of data lines 171, a plurality of drain electrodes 175 separated from the data lines 171, and a plurality of isolated metal pieces 172 are formed on the ohmic contacts 161 and 165 and the gate insulating layer 140.

The data lines 171 for transmitting data voltages extend substantially in the longitudinal direction and intersecting the gate lines 121, the storage electrode lines 131, and the connections 133e such that each data line 171 is disposed between the first and the second storage electrodes 133a and 133b in adjacent sets of the branches 133a-133d of the storage electrode lines 131. Each data line 171 includes an end portion 179 having a large area for contact with another layer or an external device and a plurality of source electrodes projecting toward the drain electrodes 175.

Each drain electrode 175 includes an end portion having a large area for contact with another layer and another end portion disposed on a gate electrode 124 and partly enclosed by a source electrode 173. A gate electrode 124, a source electrode 173, and a drain electrode 175 along with a projection 154 of a semiconductor stripe 151 form a TFT having a channel formed in the projection 154 disposed between the source electrode 173 and the drain electrode 175.

The metal pieces 172 are disposed on the gate lines 121 near the end portions of the storage electrodes 133a.

The data lines 171, the drain electrodes 175, and the metal pieces 172 are preferably made of refractory metal such as Cr, Mo, Ti, Ta or alloys thereof. However, they may also have a multilayered structure including a low-resistivity film (not shown) and a good-contact film (not shown). A good example of the combination is a lower Mo film, an intermediate Al film, and an upper Mo film as well as the above-described combinations of a lower Cr film and an upper Al—Nd alloy film and a lower Al film and an upper Mo film.

Like the gate lines 121 and the storage electrode lines 131, the data lines 171 and the drain electrodes 175 have tapered lateral sides, and the inclination angles thereof range about 30-80 degrees.

The ohmic contacts 161 and 165 are interposed only between the underlying semiconductor stripes 151 and the overlying data lines 171 and the overlying drain electrodes 175 thereon and reduce the contact resistance therebetween. The semiconductor stripes 151 include a plurality of exposed portions, which are not covered with the data lines 171 and the drain electrodes 175, such as portions located between the source electrodes 173 and the drain electrodes 175. Although the semiconductor stripes 151 are narrower than the data lines 171 at most places, the width of the semiconductor stripes 151 becomes large near the gate lines 121 and the storage electrode lines 131 as described above, to smooth the profile of the surface, thereby preventing the disconnection of the data lines 171.

A passivation layer 180 is formed on the data lines 171, the drain electrodes 175, the metal pieces 172, and the exposed portions of the semiconductor stripes 151. The passivation layer 180 is preferably made of inorganic insulator such as silicon nitride or silicon oxide, photosensitive organic material having a good flatness characteristic, or low dielectric insulating material having dielectric constant lower than 4.0 such as a-Si:C:O and a-Si:O:F formed by plasma enhanced chemical vapor deposition (PECVD). The passivation layer 180 may have a double-layered structure including a lower inorganic film and an upper organic film.

The passivation layer 180 has a plurality of contact holes 182 and 185 exposing the end portions 179 of the data lines 171 and the end portions of the drain electrodes 175, respectively. The passivation layer 180 and the gate insulating layer 140 have a plurality of contact holes 183 exposing portions of the storage electrode lines 131 near the fixed end portions of the first storage electrodes 133a and a plurality of contact holes 184 exposing the projections of the free end portions of the first storage electrodes 133a.

A plurality of pixel electrodes 190, a plurality of aligning members 198, a plurality of contact assistants 82, and a plurality of overpasses 194, which are preferably made of transparent conductor such as ITO or IZO or reflective conductor such as Ag or Al, are formed on the passivation layer 180.

The pixel electrodes 190 are physically and electrically connected to the drain electrodes 175 through the contact holes 185 such that the pixel electrodes 190 receive the data voltages from the drain electrodes 175.

The pixel electrodes 190 supplied with the data voltages generate electric fields in cooperation with the common electrode 270, which determine the orientations of liquid crystal molecules 310 in the liquid crystal layer 3.

A pixel electrode 190 and the common electrode 270 form a liquid crystal capacitor, which stores applied voltages after turn-off of the TFT. An additional capacitor called a "storage capacitor," which is connected in parallel to the liquid crystal capacitor, is provided for enhancing the voltage storing capacity. The storage capacitors are implemented by overlapping the pixel electrodes 190 with the storage electrode lines 131 including the storage electrodes 133a-133d.

Each pixel electrode 190 is chamfered at its left corners and the chamfered edges of the pixel electrode 190 make an angle of about 45 degrees with the gate lines 121.

Each pixel electrode 190 has a lower cutout 191, a center cutout 192, and an upper cutout 193, which partition the pixel electrode 190 into a plurality of partitions. The cutouts 191-193 substantially have an inversion symmetry with respect to an imaginary transverse line bisecting the pixel electrode 190.

The lower and the upper cutouts 191 and 193 obliquely extend from a right edge of the pixel electrode 190 near an upper right corner approximately to a center of a left edge of the pixel electrode 190 and overlap the third and the fourth storage electrodes 133c and 133d. The lower and the upper cutouts 191 and 193 they are disposed at lower and upper halves of the pixel electrode 190, respectively, which can be divided by the imaginary transverse line. The lower and the upper cutouts 191 and 193 make an angle of about 45 degrees to the gate lines 121, and they extend substantially perpendicular to each other.

The center cutout 192 extends along the imaginary transverse line and has an inlet from the right edge of the pixel electrode 190, which has a pair of inclined edges substantially parallel to the lower cutout 191 and the upper cutout 193, respectively.

Accordingly, the lower half of the pixel electrode 190 is partitioned into two lower partitions by the lower cutout 191 and the upper half of the pixel electrode 190 is also partitioned into two upper partitions by the upper cutout 193. The number of partitions or the number of the cutouts is varied depending on the design factors such as the size of pixels, the ratio of the transverse edges and the longitudinal edges of the pixel electrodes, the type and characteristics of the liquid crystal layer 3, and so on.

The aligning members 198 extend along the data lines 171 and fully cover the data lines 171 such that edges of the aligning members 198 are closer to the pixel electrodes 190 than the data lines 171. The aligning members 198 are floating, but they may be connected to the data lines 171 through contact holes (not shown) penetrating the gate insulating layer 140 and the passivation layer 180. Total parasitic capacitance between the data lines 171 and the pixel electrodes 190 and between the aligning members 198 and the pixel electrodes 190 is almost determined by the latter. In addition, the distance between the pixel electrodes 190 and the aligning members 198 can be uniformly maintained since they are made of the same layer. Accordingly, the parasitic capacitance of the pixel electrodes can be made uniform and thus the stitch defect due to a divisional exposure can be reduced.

The aligning members 198 can serve as detour of disconnected data lines 171 and the length of an alignment member 198 may be longer than that of two or more pixel electrodes 190.

The contact assistants 82 are connected to the end portions 179 of the data lines 171 through the contact holes 182. The contact assistants 82 protect the end portions 179 and complement the adhesion of the end portions 179 and external devices.

The overpasses 194 cross over the gate lines 121 and they are connected to the exposed projection of the fixed end portions of the first storage electrodes 133a and the exposed portions of the storage electrode lines 131 through the contact holes 184 and 183, respectively, which are disposed opposite each other with respect to the gate lines 121. The overpasses 194 overlaps the metal pieces 172 and they may be electrically connected to the metal pieces 172. The storage electrode lines 131 including the storage electrodes 133a-133d along with the overpasses 194 and the metal pieces 172 are used for repairing defects in the gate lines 121, the data lines 171, or the TFTs. The electrical connection between the gate lines 121 and the storage electrode lines 131 for repairing the gate lines 121 is obtained by illuminating the cross points of the gate lines 121 and the overpasses 194 by a laser beam to electrically connect the gate lines 121 to the overpasses 194. In this case, the metal pieces 172 enhance the electrical connection between the gate lines 121 and the overpasses 194.

The description of the common electrode panel 200 follows with reference to FIGS. 2-5.

A light blocking member 220 called a black matrix for preventing light leakage is formed on an insulating substrate 210 such as transparent glass. The light blocking member 220 may include a plurality of openings that face the pixel electrodes 190 and may have substantially the same planar shape as the pixel electrodes 190. Otherwise, the light blocking member 220 may include linear portions corresponding to the data lines 171 and other portions corresponding to the TFTs.

A plurality of color filters 230 are formed on the substrate 210 and they are disposed substantially in the areas enclosed by the light blocking member 220. The color filters 230 may extend substantially along the longitudinal direction along the pixel electrodes 190. The color filters 230 may represent one of the primary colors such as red, green and blue colors.

An overcoat 250 for preventing the color filters 230 from being exposed and for providing a flat surface is formed on the color filters 230 and the light blocking member 220.

A common electrode 270 preferably made of transparent conductive material such as ITO and IZO is formed on the overcoat 250.

The common electrode 270 has a plurality of sets of cutouts 271-273.

A set of cutouts 271-273 face a pixel electrode 190 and include a lower cutout 271, a center cutout 272, and an upper cutout 273. Each of the cutouts 271-273 is disposed between adjacent cutouts 191-193 of the pixel electrode 190 or between a cutout 191 or 193 and a chamfered edge of the pixel electrode 190. In addition, each of the cutouts 271-273 has at least an oblique portion extending parallel to the lower cutout 191 or the upper cutout 193 of the pixel electrode 190. The cutouts 271-273 have substantially an inversion symmetry with respect to the above-described transverse line bisecting the pixel electrode 190.

Each of the lower and upper cutouts 271 and 273 includes an oblique portion extending approximately from a left edge of the pixel electrode 190 approximately to lower or upper edge of the pixel electrode 190, and transverse and longitudinal portions extending from respective ends of the oblique portion along edges of the pixel electrode 190, overlapping the edges of the pixel electrode 190, and making obtuse angles with the oblique portion.

The center cutout 272 includes a central transverse portion extending approximately from the left edge of the pixel electrode 190 along the third storage electrode 133c, a pair of oblique portions extending from an end of the central transverse portion approximately to a right edge of the pixel electrode and making obtuse angles with the central transverse portion, and a pair of terminal longitudinal portions extending from the ends of the respective oblique portions along the right edge of the pixel electrode 190, overlapping the right edge of the pixel electrode 190, and making obtuse angles with the respective oblique portions.

The number of the cutouts 271-273 may be varied depending on the design factors, and the light blocking member 220 may also overlap the cutouts 271-273 to block the light leakage through the cutouts 271-273.

Alignment layers 11 and 21 that may be homeotropic are coated on inner surfaces of the panels 100 and 200, and polarizers 12 and 22 are provided on outer surfaces of the panels 100 and 200 such that their polarization axes may be crossed and one of the transmissive axes may be parallel to the gate lines 121. One of the polarizers may be omitted when the LCD is a reflective LCD.

The LCD may further include at least one retardation film (not shown) for compensating the retardation of the LC layer 3. The retardation film has birefringence and gives a retardation opposite to that given by the LC layer 3. The retardation film may include uniaxial or biaxial optical compensation film, in particular, negative uniaxial compensation film.

The LCD may further include a backlight unit (not shown) supplying light to the LC layer 3 through the polarizers 12 and 22, the retardation film, and the panels 100 and 200.

It is preferable that the LC layer 3 has negative dielectric anisotropy and it is subjected to a vertical alignment that the LC molecules 310 in the LC layer 3 are aligned such that their long axes are substantially vertical to the surfaces of the panels 100 and 200 in absence of electric field. Accordingly, incident light cannot pass the crossed polarization system 12 and 22.

As shown in FIG. 3, a set of the cutouts 191-193 and 271-273 divides a pixel electrode 190 into a plurality of sub-areas and each sub-area has two major edges.

The cutouts 191-193 and 271-273 control the tilt directions of the LC molecules in the LC layer 3. This will be described in detail.

Upon application of the common voltage to the common electrode 270 and a data voltage to the pixel electrodes 190, an electric field substantially perpendicular to the surfaces of the panels 100 and 200 is generated. The LC molecules 310 tend to change their orientations in response to the electric field such that their long axes are perpendicular to the field direction.

The cutouts 191-193 and 271-273 of the electrodes 190 and 270 and the edges of the pixel electrodes 190 distort the electric field to have a horizontal component that is substantially perpendicular to the edges of the cutouts 191-193 and 271-273 and the edges of the pixel electrodes 190. Accordingly, the LC molecules on each sub-area are tilt in a direction by the horizontal component and the azimuthal distribution of the tilt directions are localized to four directions, thereby increasing the viewing angle of the LCD.

The width of the cutouts 191-193 and 27-273 is preferably in a range between about nine microns to about twelve microns.

At least one of the cutouts 191-193 and 27-273 can be substituted with protrusions (not shown) or depressions (not shown). The protrusions are preferably made of organic or inorganic material and disposed on or under the field-generating electrodes 190 or 270 and have a width of about five microns to about ten microns.

The shapes and the arrangements of the cutouts 191-193 and 271-273 may be modified.

Since the tilt directions of all domains make an angle of about 45 degrees with the gate lines 121, which are parallel to or perpendicular to the edges of the panels 100 and 200, and the 45-degree intersection of the tilt directions and the transmissive axes of the polarizers 12 and 22 gives maximum transmittance, the polarizers 12 and 22 can be attached such that the transmissive axes of the polarizers 12 and 22 are parallel to or perpendicular to the edges of the panels 100 and 200 and it reduces the production cost.

An LCD according to another embodiment of the present invention will be described in detail with reference to FIGS. 6 and 7.

Figure 6:
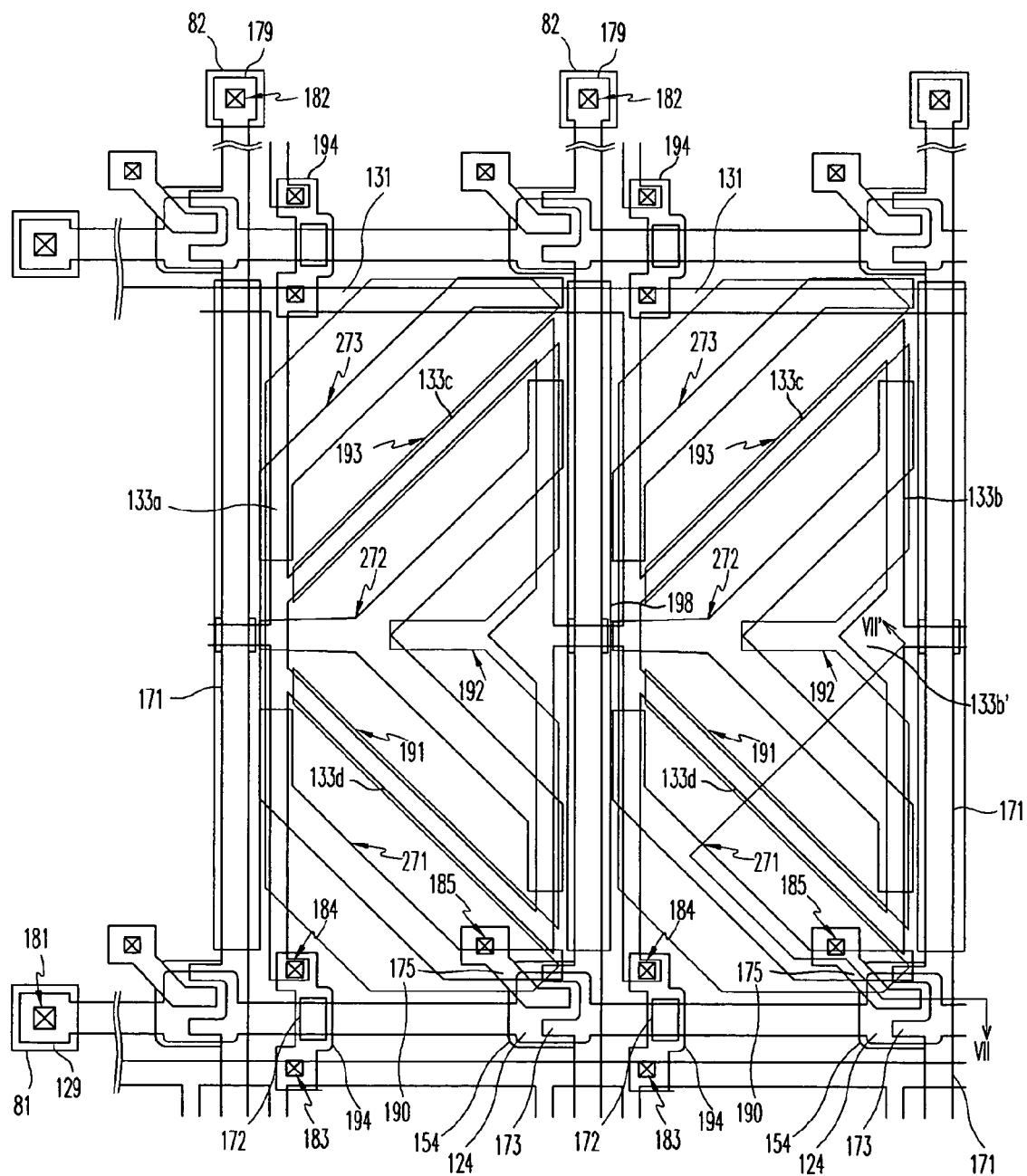
FIG. 6 is a layout view of an LCD according to another embodiment of the present invention.
Figure 7:
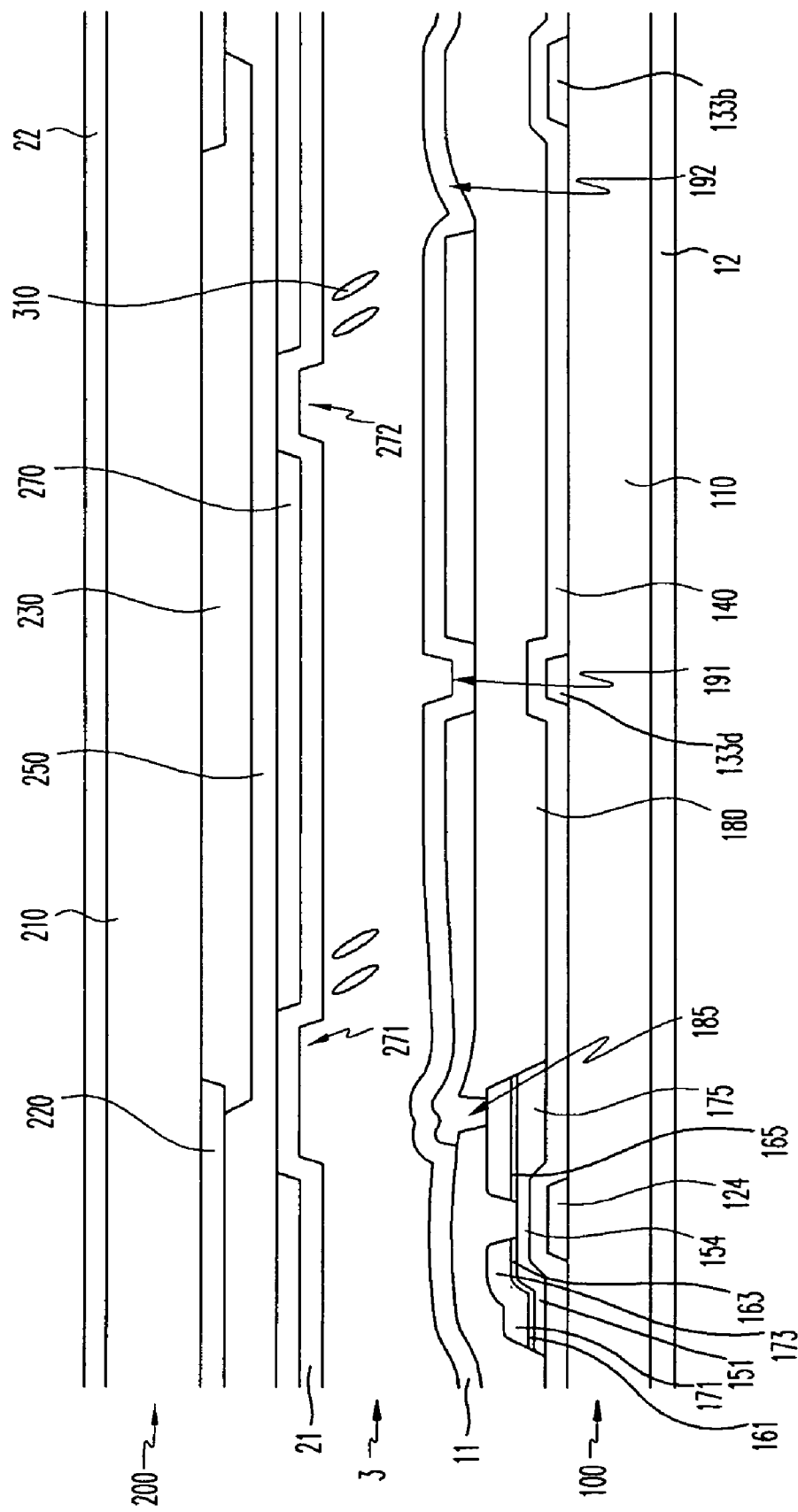
FIG. 7 is a sectional view of the LCD shown in FIG. 6 taken along the line VII-VII'.

FIG. 6 is a layout view of an LCD according to another embodiment of the present invention, and FIG. 7 is a sectional view of the LCD shown in FIG. 6 taken along the line VII-VII'.

Referring to FIGS. 6 and 7, an LCD according to this embodiment also includes a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 according to this embodiment are almost the same as those shown in FIGS. 1-5.

Regarding the TFT array panel 100, a plurality of gate lines 121 including gate electrodes 124 and a plurality of storage electrode lines 131 are formed on a substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including source electrodes 173 and end portions 179, a plurality of drain electrodes 175, and a plurality of isolated metal pieces 172 are formed on the ohmic contacts 161 and 165, and a passivation layer 180 is formed thereon. A plurality of contact holes 182-185 are provided at the passivation layer 180 and the gate insulating layer 140. A plurality of pixel electrodes 190 having a plurality of cutouts 191-193, a plurality of aligning members 198, a plurality of contact assistants 82, and a plurality of overpasses 194 are formed on the passivation layer 180, and an alignment layer 11 is coated thereon.

Regarding the common electrode panel 200, a light blocking member 220, a plurality of color filters 230, an overcoat 250, a common electrode 270 having a plurality of cutouts 271-273, and an alignment layer 21 are formed on an insulating substrate 210.

Different from the LCD shown in FIGS. 1-5, the semiconductor stripes 151 of the TFT array panel 100 according to this embodiment have almost the same planar shapes as the data lines 171 and the drain electrodes 175 as well as the underlying ohmic contacts 161 and 165. However, the projections 154 of the semiconductor stripes 151 include some exposed portions, which are not covered with the data lines 171 and the drain electrodes 175, such as portions located between the source electrodes 173 and the drain electrodes 175.

Furthermore, the TFT array panel 100 further includes a plurality of semiconductor islands (not shown) and a plurality of ohmic contact islands (not shown) disposed thereon, which are disposed on the metal pieces 172.

Moreover, the storage electrodes 133b have triangular protrusions having edges substantially parallel to oblique edges of the cutouts 192.

In addition, the gate lines 121 have expanded end portion 129, respectively. Accordingly, a plurality of contact holes 181 exposing the end portions 129 of the gate lines 121 are provided at the gate insulating layer 140 and the passivation layer 180, and a plurality of contact assistants 81 connected to the end portions 129 through the contact holes 181 are additionally provided.

A manufacturing method of the TFT array panel according to an embodiment simultaneously forms the data lines 171, the drain electrodes 175, the metal pieces 172, the semiconductors 151, and the ohmic contacts 161 and 165 using one photolithography process.

A photoresist pattern for the photolithography process has position-dependent thickness, and in particular, it has first and second portions with decreased thickness. The first portions are located on wire areas that will be occupied by the data lines 171, the drain electrodes 175, and the metal pieces 172 and the second portions are located on channel areas of TFTs.

The position-dependent thickness of the photoresist is obtained by several techniques, for example, by providing translucent areas on the exposure mask as well as transparent areas and light blocking opaque areas. The translucent areas may have a slit pattern, a lattice pattern, a thin film(s) with intermediate transmittance or intermediate thickness. When using a slit pattern, it is preferable that the width of the slits or the distance between the slits is smaller than the resolution of a light exposer used for the photolithography. Another example is to use reflowable photoresist. In detail, once a photoresist pattern made of a reflowable material is formed by using a normal exposure mask only with transparent areas and opaque areas, it is subject to reflow process to flow onto areas without the photoresist, thereby forming thin portions.

As a result, the manufacturing process is simplified by omitting a photolithography step.

Many of the above-described features of the LCD shown in FIGS. 1-5 may be appropriate to the TFT array panel shown in FIGS. 6 and 7.

An LCD according to another embodiment of the present invention will be described in detail with reference to FIGS. 8 and 9.

Figure 8:
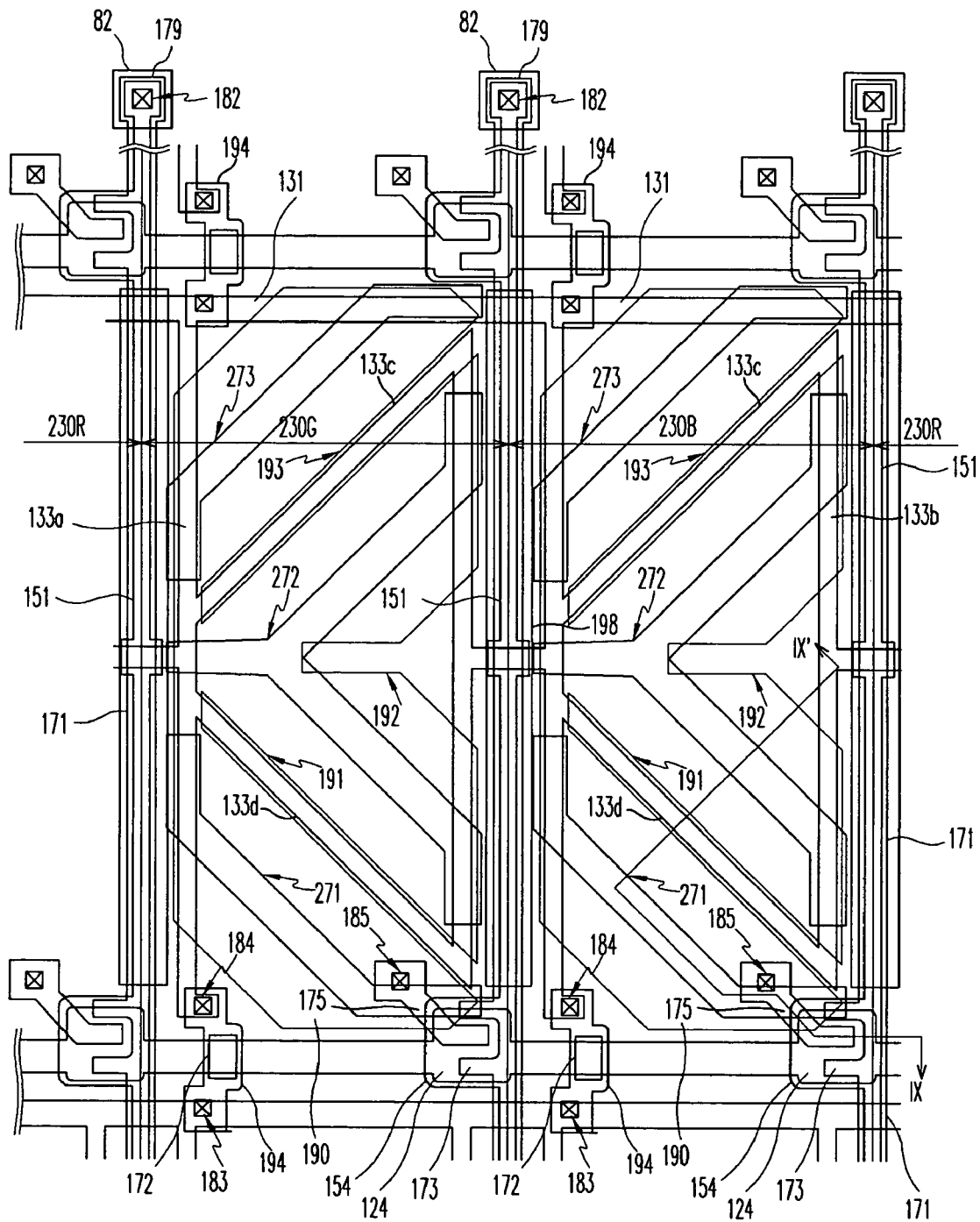
FIG. 8 is a layout view of an LCD according to another embodiment of the present invention.
Figure 9:
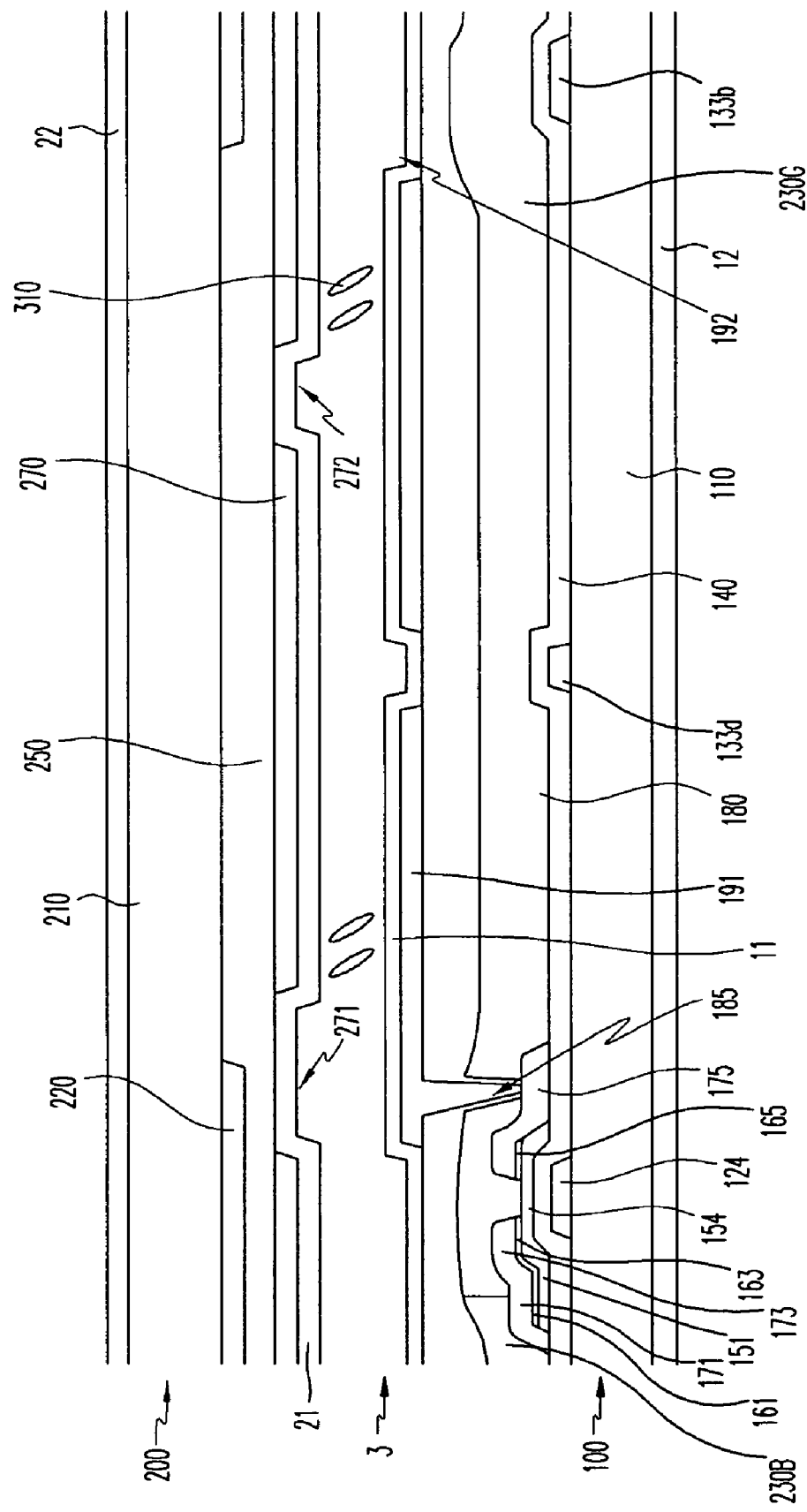
FIG. 9 is a sectional view of the LCD shown in FIG. 8 taken along the line IX-IX'.

FIG. 8 is a layout view of an LCD according to another embodiment of the present invention, and FIG. 9 is a sectional view of the LCD shown in FIG. 8 taken along the line IX-IX'.

Referring to FIGS. 8 and 9, an LCD according to this embodiment also includes a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 according to this embodiment are almost the same as those shown in FIGS. 1-4.

Regarding the TFT array panel 100, a plurality of gate lines 121 including gate electrodes 124 and a plurality of storage electrode lines 131 are formed on a substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including source electrodes 173 and end portions 179, a plurality of drain electrodes 175, and a plurality of isolated metal pieces 172 are formed on the ohmic contacts 161 and 165, and a passivation layer 180 is formed thereon. A plurality of contact holes 182-185 are provided at the passivation layer 180 and the gate insulating layer 140, and a plurality of pixel electrodes 190 having a plurality of cutouts 191-193, a plurality of aligning members 198, a plurality of contact assistants 82, and a plurality of overpasses 194 are formed on the passivation layer 180.

Regarding the common electrode panel 200, a light blocking member 220, an overcoat 250, a common electrode 270 including a plurality of cutouts 271-273, and an alignment layer 21 are formed on an insulating substrate 210.

Different from the LCD shown in FIGS. 1-5, the TFT array panel 100 includes a plurality of color filter stripes 230 disposed under the passivation layer 180, while the TFT array panel 100 has no color filter. The color filter stripes 230 extend along a longitudinal direction and edges of adjacent two of the color filter stripes 230 exactly match with each other on the data lines 171, but the color filters 230 may overlap each other to block the light leakage between the pixel electrodes 190, or may be spaced apart from each other. When the color filters 230 overlap each other, a light blocking member 220 disposed on a common electrode panel 200 may be omitted.

The light blocking member 220 may be also disposed on the TFT array panel 100 rather than the common electrode panel 200.

Many of the above-described features of the LCD shown in FIGS. 1-5 may be appropriate to the TFT array panel shown in FIGS. 8 and 9.

An LCD according to another embodiment of the present invention will be described in detail with reference to FIGS. 10-11.

Figure 10:
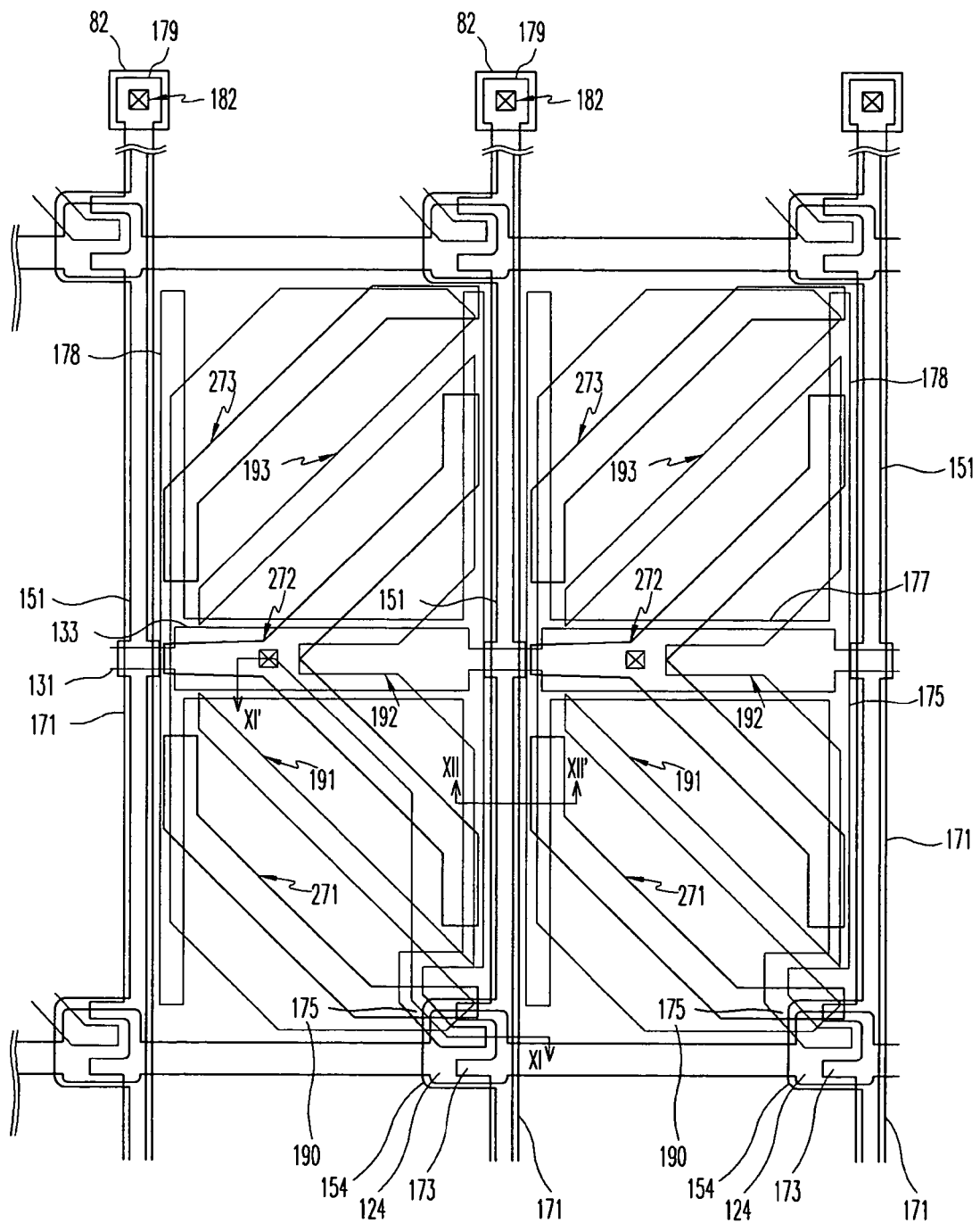
FIG. 10 is a layout view of an LCD according to another embodiment of the present invention.
Figure 11:
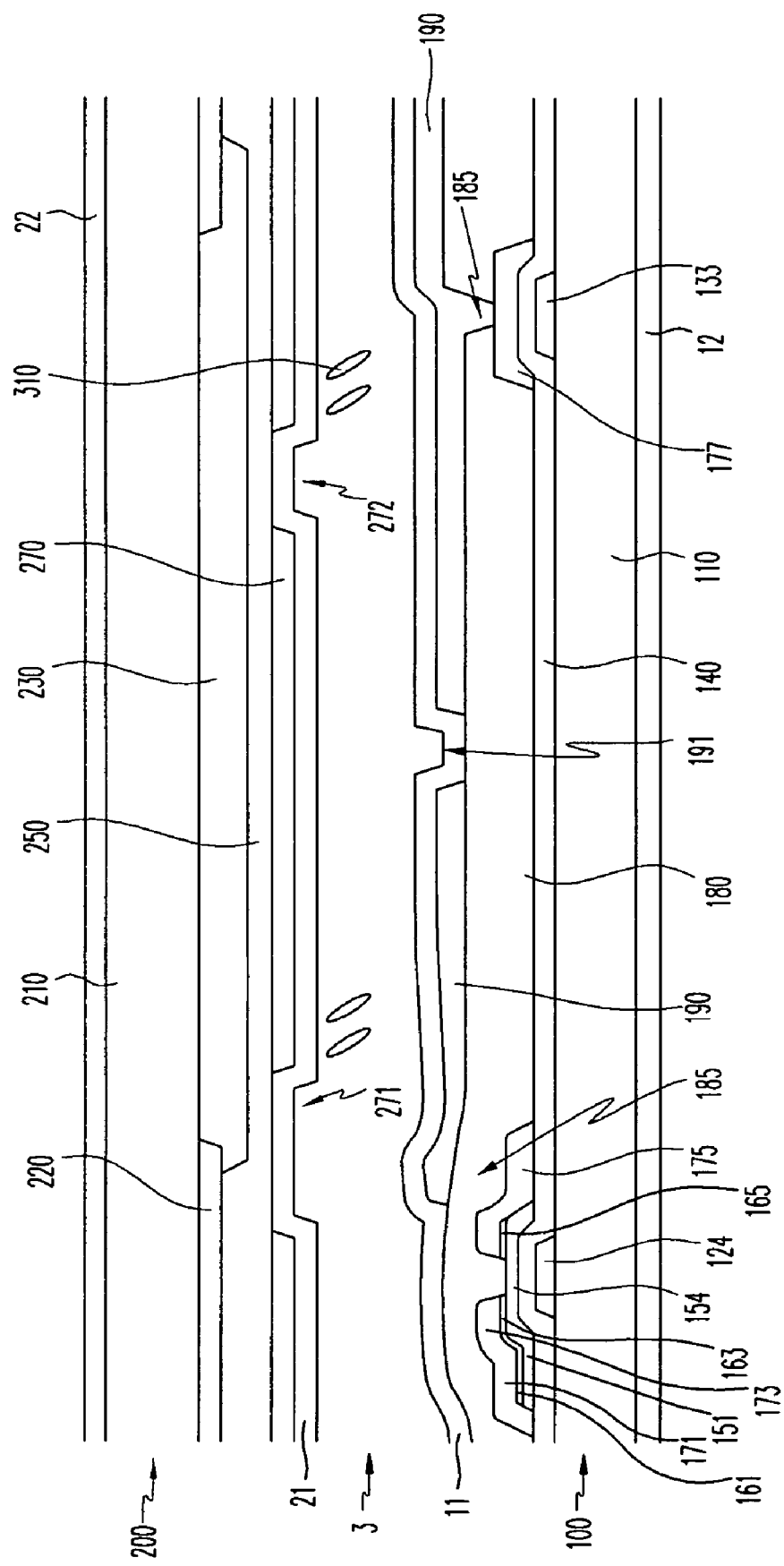
FIGS. 11 and 12 are sectional views of the LCD shown in FIG. 10 taken along the lines XI-XI' and XII-XII'.
Figure 12:
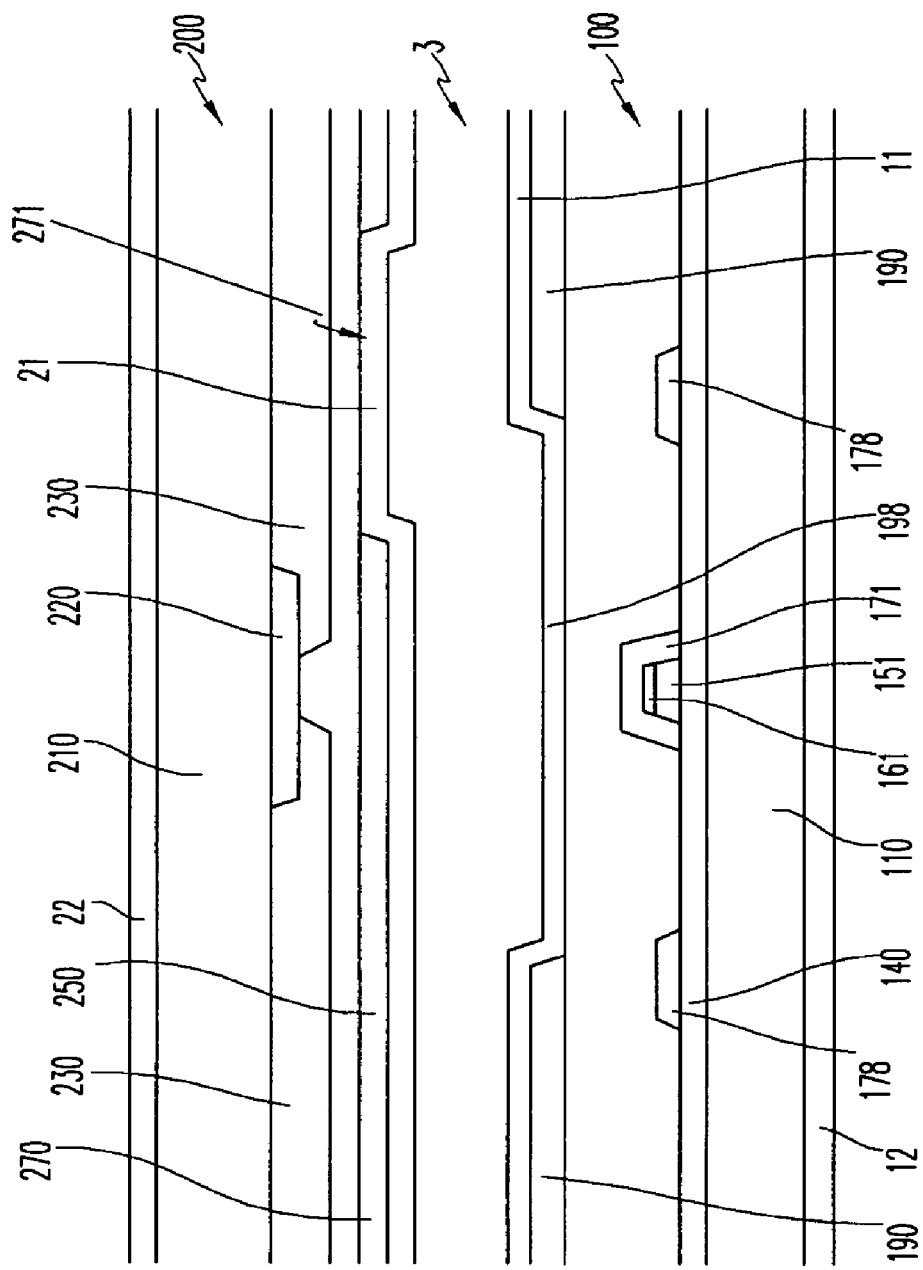

FIG. 10 is a layout view of an LCD according to another embodiment of the present invention, and FIGS. 11 and 12 are sectional views of the LCD shown in FIG. 10 taken along the lines XI-XI' and XII-XII'.

Referring to FIGS. 10-12, an LCD according to this embodiment also includes a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 according to this embodiment are almost the same as those shown in FIGS. 1-5.

Regarding the TFT array panel 100, a plurality of gate lines 121 including gate electrodes 124 and a plurality of storage electrode lines 131 are formed on a substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including source electrodes 173 and end portions 179 and a plurality of drain electrodes 175 are formed on the ohmic contacts 161 and 165 and the gate insulating layer 140, and a passivation layer 180 is formed thereon. A plurality of contact holes 182 and 185 are provided at the passivation layer 180 and the gate insulating layer 140. A plurality of pixel electrodes 190 having a plurality of cutouts 191-193 and a plurality of contact assistants 82 are formed on the passivation layer 180 and an alignment layer 11 is coated thereon.

Regarding the common electrode panel 200, a light blocking member 220, a plurality of color filters 230, an overcoat 250, a common electrode 270 including a plurality of cutouts 271-273, and an alignment layer 21 are formed on an insulating substrate 210.

Different from the LCD shown in FIGS. 1-5, the storage electrode lines 131 are substantially linear and substantially equidistant from adjacent gate lines 121. The storage electrodes lines 131 have a plurality of expansions protruding upward and downward. Furthermore, there is no overpass, no contact hole related thereto, and no isolated metal piece.

In addition, each of the drain electrodes 175 extends to form an aligning member 178 that includes a pair of longitudinal portions extending substantially parallel to the data lines 171 and disposed adjacent to respective data lines 171 and a pixel electrode 190 and a transverse portion 177 connecting the two longitudinal portions and overlapping the expansion of a storage electrode line 131. The longitudinal portions have edges closer to the pixel electrodes 190 than the data lines 171. In other words, the longitudinal portions have edges disposed between the pixel electrodes 190 and the data lines 171. Accordingly, the parasitic capacitance between the pixel electrodes 190 and the data lines 171 is substantially equal to the parasitic capacitance between the aligning members 178 and the data lines 171, which is uniform.

Many of the above-described features of the LCD shown in FIGS. 1-5 may be appropriate to the TFT array panel shown in FIGS. 10-12.

An LCD according to another embodiment of the present invention will be described in detail with reference to FIGS. 13 and 14.

Figure 13:
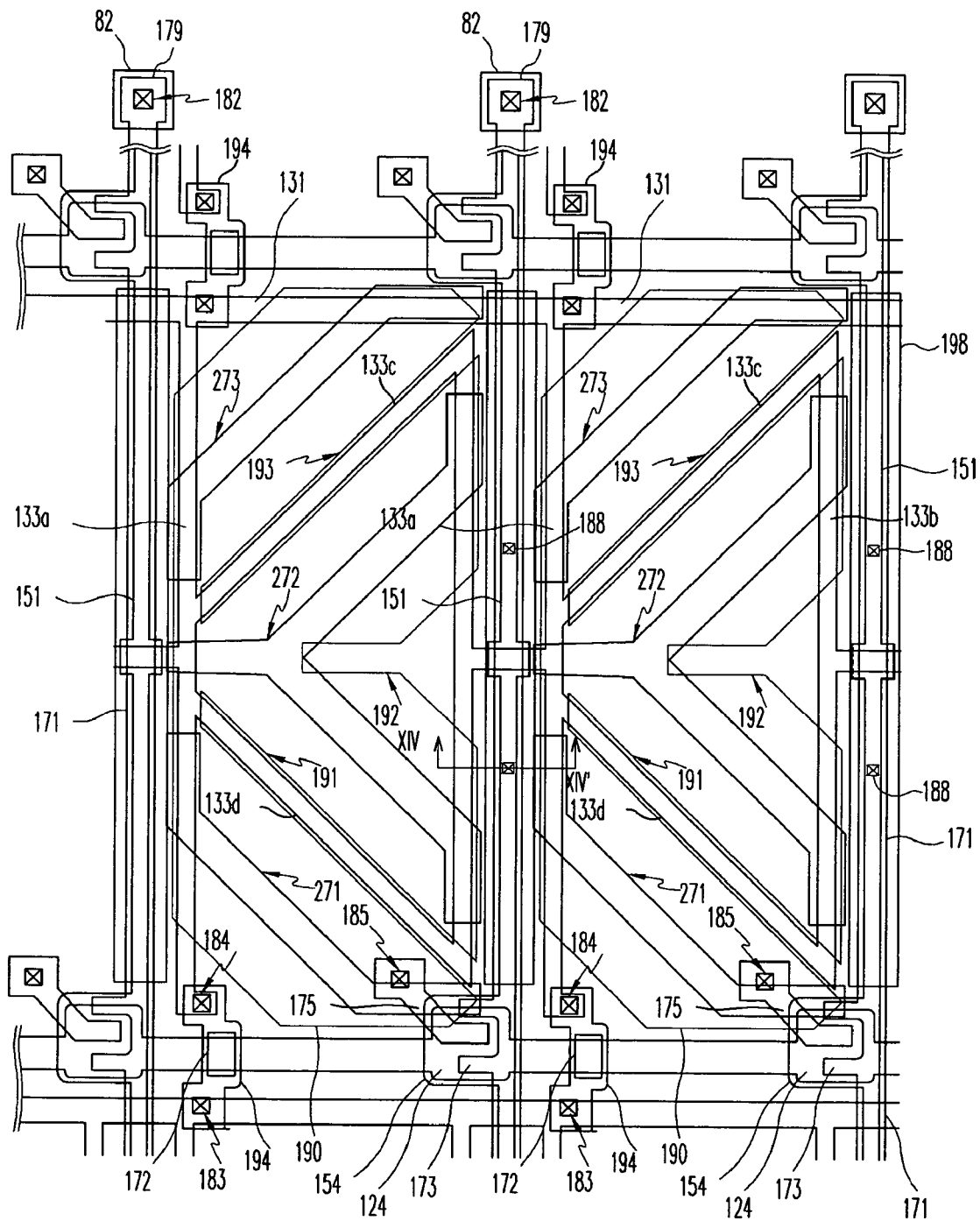
FIG. 13 is a layout view of an LCD according to another embodiment of the present invention.
Figure 14:
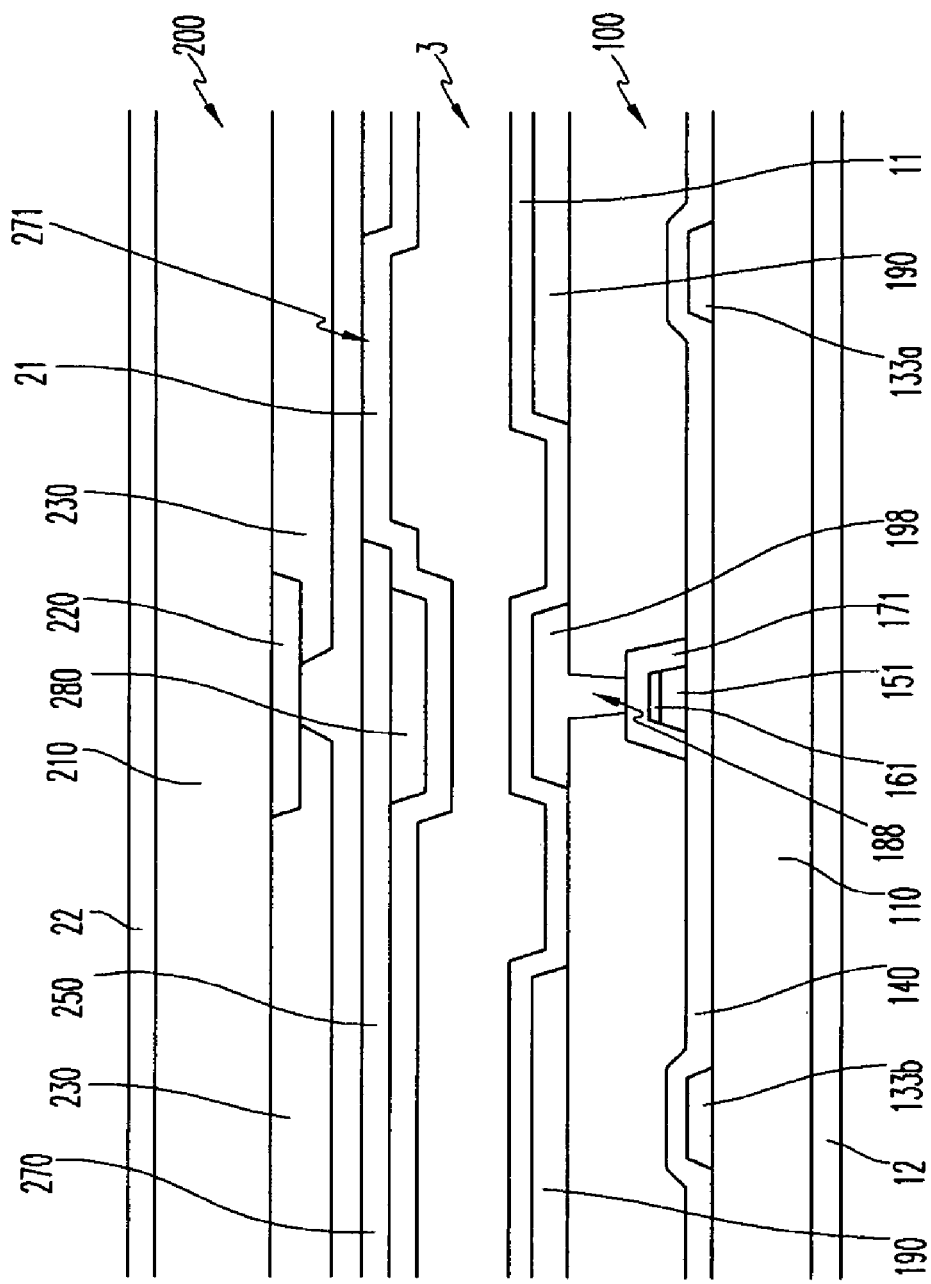
FIG. 14 is a sectional view of the LCD shown in FIG. 13 taken along the line XIII-XIII'.

FIG. 13 is a layout view of an LCD according to another embodiment of the present invention, and FIG. 14 is a sectional view of the LCD shown in FIG. 13 taken along the line XIII-XIII'.

Referring to FIGS. 11 and 12, an LCD according to this embodiment also includes a TFT array panel 100, a common electrode panel 200, a LC layer 3 interposed between the panels 100 and 200, and a pair of polarizers 12 and 22 attached on outer surfaces of the panels 100 and 200.

Layered structures of the panels 100 and 200 according to this embodiment are almost the same as those shown in FIGS. 13 and 14.

Regarding the TFT array panel 100, a plurality of gate lines 121 including gate electrodes 124 and a plurality of storage electrode lines 131 are formed on a substrate 110, and a gate insulating layer 140, a plurality of semiconductor stripes 151 including projections 154, and a plurality of ohmic contact stripes 161 including projections 163 and a plurality of ohmic contact islands 165 are sequentially formed thereon. A plurality of data lines 171 including source electrodes 173 and end portions 179, a plurality of drain electrodes 175, and a plurality of isolated metal pieces 172 are formed on the ohmic contacts 161 and 165, and a passivation layer 180 is formed thereon. A plurality of contact holes 182-185 are provided at the passivation layer 180 and the gate insulating layer 140. A plurality of pixel electrodes 190 having a plurality of cutouts 191-193, a plurality of aligning members 198, a plurality of contact assistants 82, and a plurality of overpasses 194 are formed on the passivation layer 180.

Regarding the common electrode panel 200, a light blocking member 220, an overcoat 250, a common electrode 270 including a plurality of cutouts 271-273, and an alignment layer 21 are formed on an insulating substrate 210.

Different from the LCD shown in FIGS. 1-5, the passivation layer 180 has a plurality of contact holes 188 exposing the data lines 171 and the aligning members 198 are connected to the data lines 171 through the contact holes 188.

In addition, the common electrode panel 200 includes a plurality of short-circuit prevention members 280 disposed on the common electrode 270 and facing the aligning members 198. The short-circuit prevention members 280 prevents the direct contact between the common electrode 270 and the aligning members 198. The short-circuit prevention members 280 may be formed along with columnar spacers for maintaining a gap between the panels 100 and 200 by using a mask having position-dependent light transmittance.

Many of the above-described features of the LCD shown in FIGS. 1-5 may be appropriate to the TFT array panel shown in FIGS. 13 and 14.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A thin film transistor array panel comprising:
   a first signal line;
   a second signal line intersecting the first signal line;
   a thin film transistor connected to the first signal line and the second signal line;
   a pixel electrode connected to the thin film transistor; and
   an aligning member extending substantially parallel to the second signal line, overlapping the second signal line, and having an edge closer to the pixel electrode than the second signal line,
   wherein the aligning member is electrically floating.

2. The thin film transistor array panel of claim 1, wherein the aligning member and the pixel electrode are disposed on the same layer.

3. A thin film transistor array panel comprising:
   a first signal line;
   a second signal line intersecting the first signal line;
   a thin film transistor connected to the first signal line and the second signal line;
   a pixel electrode connected to the thin film transistor; and
   an aligning member extending substantially parallel to the second signal line, overlapping the second signal line, and having an edge closer to the pixel electrode than the second signal line,
   wherein the aligning member has substantially the same voltage as the second signal line.

4. A liquid crystal display comprising:
   a first panel including a first signal line, a second signal line intersecting the first signal line, a thin film transistor connected to the first signal line and the second signal line, a pixel electrode connected to the thin film transistor, and an aligning member extending substantially parallel to the second signal line and having an edge closer to the pixel electrode than the second signal line;
   a second panel facing the first panel and including a common electrode formed thereon; and
   a liquid crystal layer disposed between the first panel and the second panel,
   wherein the aligning member is electrically floating or has substantially the same voltage as the second signal line.

5. The liquid crystal display of claim 4, further comprising a tilt direction determining member disposed on at least one of the first and the second panels and determining tilt directions of liquid crystal molecules of the liquid crystal layer.

6. The liquid crystal display of claim 5, wherein the liquid crystal layer has negative dielectric anisotropy and is subjected to vertical alignment.

7. The liquid crystal display of claim 5, wherein the tilt direction determining member comprises a cutout formed at the pixel electrode or the common electrode.

8. The liquid crystal display of claim 7, wherein the tilt direction determining member has a width ranging about 9-12 microns.

9. The liquid crystal display of claim 5, wherein the tilt direction determining member makes an angle of about 45 degrees with the first signal line.

10. The liquid crystal display of claim 5, wherein the tilt direction determining member comprises a protrusion formed on the pixel electrode or the common electrode.

* * * * *